April 26, 1949.　　　O. H. SCHMITT　　　2,468,688
IMPEDANCE MATCHER FOR RADIO FREQUENCY BRIDGES
Filed Nov. 27, 1945
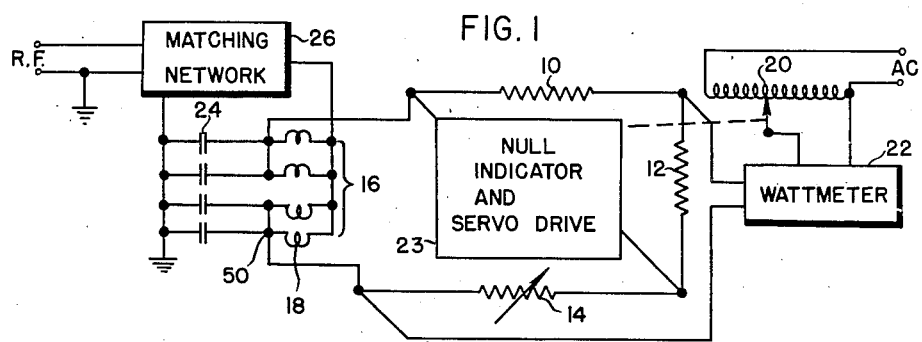
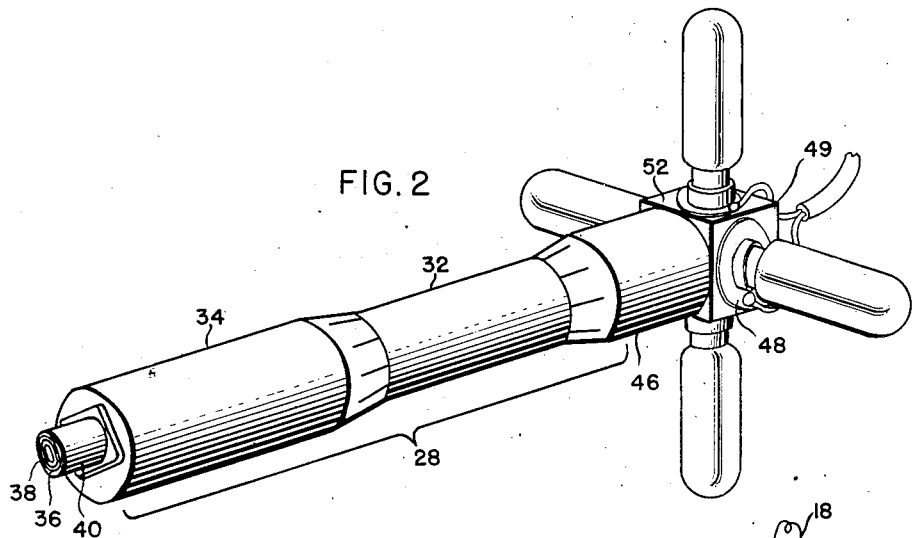
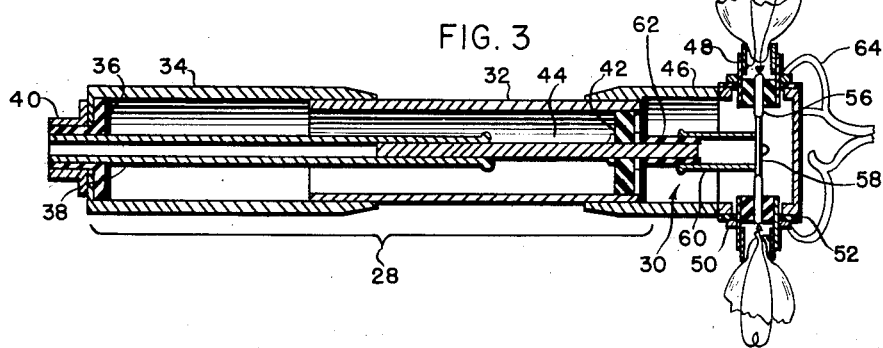
INVENTOR.
OTTO H. SCHMITT
BY
William D. Hall,
ATTORNEY

Patented Apr. 26, 1949

2,468,688

UNITED STATES PATENT OFFICE 2,468,688

IMPEDANCE MATCHER FOR RADIO-FREQUENCY BRIDGES

Otto H. Schmitt, Mineola, N. Y., assignor to the United States of America as represented by the Secretary of War Application November 27, 1945, Serial No. 631,178

3 Claims. (Cl. 178—44)

This invention relates to power measuring apparatus and more particularly to apparatus for measuring radio frequency power.

Measurement of electrical power becomes increasingly difficult as the frequency increases.

The invention, together with further features and refinements thereof, will be apparent from the following detailed description, in which:

Fig. 1 is the schematic wiring diagram of the present invention;

Fig. 2 is a perspective view of one embodiment of the present invention; and

Fig. 3 is a longitudinal section of the device in Fig. 2.

Referring now to the specific embodiment, there is shown in Fig. 1 a four-arm bridge comprising resistors 10, 12, 14 and 16. Resistor 14 in this instance is variable and is preferably large in comparison with all the other resistors. Resistor 16, comprising a series arrangement of two pairs of lamps 18 in parallel, is large in comparison with resistor 10. As such, resistor 16 comprises a non-linear temperature-resistance device and any other type of device having such a non-linear characteristic may be substituted for resistor 16. Power from a commercial or other suitable source is supplied from adjustable autotransformer 20 between the junction of resistors 10 and 12 and the junction of resistors 14 and 16. A null indicator 23 is connected between the junction of resistors 10 and 16 and the junction of resistors 12 and 14.

If desired, a servo system may be associated with or replace null indicator 23. Applicant has chosen to use both the servo system and the null indicator. This servo system may be adapted to maintain the setting of the autotransformer 20 such that a null exists at all times. The lamps 18 are by-passed to ground immediately adjacent their bases by capacitors 24, and the radio frequency apparatus to be tested is connected through matching network 26 between the common junction of the four lamps 18 and ground. With this arrangement, there is a balanced drop of radio-frequency voltage from the common lamp terminals to the junction of resistors 10 and 16 and to the junction of resistors 14 and 16 of the bridge resulting in equal heating of the lamps. The by-pass arrangement and the relatively high radio-frequency impedance of the bridge as seen from the lamp load tend to maintain isolation between the radio-frequency circuit and the remainder of the bridge. Conversely, there is isolation of the commercial power source from the R.-F. circuit because of the low-frequency blocking action of capacitors 24 and a series capacitor (to be described) in the matching network 26.

In operation, power from the commercial source is adjusted by means of autotransformer 20 to an optimum value with no radio-frequency source connected and the bridge is balanced by adjusting resistor 14. Later, with an unknown amount of radio-frequency power applied to lamps 18, device 20 is adjusted either manually, using the null indicator as a guide, or automatically, by means of a suitable servo device, until the bridge is again balanced. The reduction in wattmeter reading represents the radio-frequency power input. It is to be noted that regardless of the radio-frequency power input to the R.-F. circuit the R.-F. load resistance remains constant. This is frequently an important consideration in testing R.-F. power sources.

A suitable mechanical arrangement for matching network 26, utilizing commercial lamps 18, for use at frequencies of the order of 200 megacycles, is shown in Figs. 2 and 3. The matching network comprises a telescoping variable-length coaxial R.-F. transmission line 28 and an adjustable series capacitor 30.

A central cylinder 32 is surrounded at one end by casing 34 which is closed at one end except for a central aperture through which flanged, tubular, insulating member 36 extends. Tightly fitted within member 36 is a tubular conductor 38, coaxial with casing 34 and cylinder 32. External of member 36 and secured to casing 34 is a member 40 which together with the end portion of tube 38 constitutes a coaxial connector. At the end of cylinder 32 remote from member 36 is an insulating annulus 42 through which a rod 44 extends. This rod 44 is rigidly secured to annulus 42 which in turn is fixed rigidly with respect to cylinder 32. Rod 44 establishes a sliding connection within tube 38.

Another casing 46 contacts cylinder 32 externally and supports four lamp sockets 48. These lamp sockets are insulated from but rigidly secured to the squared end portion 49, Fig. 2, of casing 46. The flanges 50 of the lamp sockets 48 together with mica or other suitable dielectric spacers 52, comprise by-pass capacitors 24, Fig. 1. The center contacts 56 of all four sockets are connected by a crossed-wire member 58 which supports a tubular conductor 60. Movable within tube 60 but external of and rigidly fixed to an axial extension of rod 44 is a sleeve 62 of dielectric material. Members 44, 60 and 62 constitute a series capacitor in matching network 26, which may be varied by sliding casing 46 along cylinder 32. In addition to its function in determining the characteristics of the network, this series capacitor isolates the commercial power from the R.-F. source. Leads 64 connect pairs of flanges 50 and are connected to the junction of resistors 10 and 16 and the junction of resistors 14 and 16.

The network described is desirable not only for impedance matching between the radio frequency device to be tested and the commercially available lamps used, but also for effective loading and for maintaining a minimum standing-wave-ratio along the transmission line connecting the radio frequency source to the matching network throughout the range of frequencies at which it is required to test the radio frequency source. In the range of radio frequencies to be considered, the lamps may not be considered purely resistive. They have reactive characteristics that should be taken into consideration in the R.-F. circuit, but are purely resistive in the commercial power circuit.

It has been said that the load resistance presented to the R.-F. source remains constant despite changes in R.-F. power. Its value is different for different frequencies, unless the matching network is readjusted at each frequency, where the reactive component of the lamp impedance is significant. The use of a properly designed matching network minimizes the range of resistance variation over a test frequency band. A further caution is to be observed at very high frequencies. The R.-F. power may be partially dissipated in dielectric losses in the lamp bases and in radiation and may not be wholly dissipated in heating the filaments.

Through the use of bridge resistance elements in the proportions described, a negligible amount of commercial power input to the bridge is consumed outside the lamps. This is not only economical but imparts sensitivity to the wattmeter system, a sensitivity lacking were the change in wattmeter readings slight for wide changes in R.-F. power input. The wattmeter may be connected at the input terminals of device 20 with no disadvantage if there is little power consumed therein and if that consumed power remains constant even when the bridge input varies. The number of lamps used may be varied according to the radio frequency loading requirements. In so doing, however, it is desirable to retain the balanced series or series-parallel arrangement shown.

While there has been described what is at present considered the preferred embodiment of the invention, it will be obvious to those skilled in the art that various changes and modifications may be made therein without departing from the invention.

What is claimed is:

1. In a radio frequency power measuring bridge, an impedance matching network comprising a variable capacitor and an extensible coaxial transmission line having an outer and an inner conductor, said outer conductor comprising a central section and two end sections, each end of said central section telescoping into one of said outer sections, said inner conductor comprising a hollow tube and a rod slidably mounted in said tube, said variable capacitor comprising an axial extension of said slidably mounted rod external of said tube and a fixed plate cooperating with said extension.

2. In a radio frequency power measuring bridge, an impedance matching network comprising a variable capacitor and an extensible coaxial transmission line having an outer and an inner conductor, said outer conductor comprising a central section and two end sections, each end of said central section telescoping into one of said outer sections, said inner conductor comprising a rod fixedly mounted in an insulating annulus, said annulus being fixedly secured to said central section, said variable capacitor comprising an axial extension of said rod and a tube slidable over said rod in response to a variation in the length of said line.

3. In a radio frequency power measuring bridge, an impedance matching network comprising a variable capacitor and an extensible coaxial transmission line having an outer and an inner conductor, said outer conductor comprising a central section and two end sections, each end of said central section telescoping into one of said outer sections, said inner conductor comprising a rod fixedly mounted in an insulating annulus, said annulus being fixedly secured to said central section, said variable capacitor comprising a first plate formed by an axial extension of said rod, a second plate formed by a tube slidable over said rod in response to a variation in the length of said line and a sleeve of dielectric material fixedly attached to said first plate.

OTTO H. SCHMITT.

REFERENCES CITED

The following references are of record in the file of this patent:

UNITED STATES PATENTS

| Number | Name | Date |
| --- | --- | --- |
| 1,590,420 | Chubb | June 26, 1926 |
| 1,901,741 | Fetsch | Mar. 14, 1933 |
| 2,314,764 | Brown | Mar. 23, 1943 |
| 2,398,606 | Wang | Apr. 16, 1943 |
| 2,399,481 | George | Apr. 30, 1946 |
| 2,399,674 | Harrison | May 7, 1946 |
| 2,404,279 | Dow | July 16, 1946 |
| 2,407,075 | Gurewitsch | Sept. 3, 1946 |
| 2,427,752 | Strempel | Sept. 23, 1947 |